Patented Oct. 17, 1933

1,931,110

UNITED STATES PATENT OFFICE 1,931,110

RUBBER COATED FABRIC

William Stewart Gocher, Fairfield, Conn., and Arthur N. Parrett, Wilmington, Del., assignors to E. I. du Pont de Nemours & Company, Wilmington, Del., a corporation of Delaware No Drawing. Application December 31, 1927
Serial No. 244,041

5 Claims. (Cl. 91—68)

This invention relates to a fabric coating composition and a method of preparing the same, and more particularly to a rubber coated fabric having a colored adherent finish of great durability.

It has been customary to finish rubber coated fabrics with a protective top coat. Various types of protective coatings have been used but none of them, so far as we are aware, are able to satisfactorily withstand continuous exposure to sunlight and weather with the probable exception of very dark colored asphalt varnishes.

An object of this invention is to provide a colored finish of great outdoor durability which may be applied to rubber coated fabrics or other suitable bases. A further object of the invention is to produce a colored rubberized fabric having an adherent finish which will satisfactorily withstand the effects of exposure to sunlight and weather. Other objects will appear hereinafter.

These objects are accomplished by the following invention which comprises the use of a hydrocarbon oil obtained by heating asphalt, petroleum residue, stearin pitch, or other bituminous materials to a temperature such that decomposition occurs and an oil distills off which is usually brownish in color and of a very fluid nature. This oil is highly unsaturated in nature and contains materials of varying boiling points so that it may be redistilled and fractionated. Thus any desired proportion of the lower boiling material can be removed from the oil simply by heating in an open vessel or by distilling in a suitable apparatus. For the sake of convenience and clarity, the above described material whether fractionated or not, will hereinafter be called "asphalt oil". Stated more specifically, by the terms "asphalt oil", as used herein, we mean an unsaturated distillate of asphalt obtained by the destructive distillation of asphalt, petroleum residue, stearin pitch or other bituminous materials.

Since a certain amount of the asphalt oil penetrates into the base composition over which the asphalt oil varnishes are applied and baked, and since the asphalt oil has a tendency to polymerize on baking due to its unsaturated nature, a physical union is formed, we believe, between the varnish and the rubber composition or other base over which the varnish is baked, producing thereby a finish which does not crack in wide cracks nor peel on exposure to sunlight or weather.

The examples given below illustrate various modifications in which our invention may be carried out.

One embodiment comprises a composition containing asphalt oil, pigment, drying oil and thinner and may be prepared according to the following procedure. A straight run Mexican flux is distilled in the usual type cracking still. This distillate is then bodied by heating in an open container until it loses about 35% of its original volume and reaches a suitable viscosity. A log of a typical run is given below.

| Time | Temperature | Viscosity | Weight | Percent Loss |
|---|---|---|---|---|
| 10:30 A.M. | Room | | 850 | |
| 11:00 | 200° F. | | | |
| 12:00 noon | 310 | | | |
| 1:00 P.M. | 300 | | | |
| 1:30 | 400 | | | |
| 1:33 | 420 | 45 at 32° | | |
| 1:45 | 450 | | | |
| 2:45 | 450 | 56 at 32° | | |
| 3:15 | 450 | 75 at 27° | | |
| 3:20 | Pulled from fire and allowed to cool. | | | |
| Next day | 24° C. | 116.2 sec. | 602 | 29.2 |

The pigments consisting of 7.5 parts by weight of chrome green, 4 parts chrome yellow, and 2.65 of iron oxide are blended in a ball mill with 2.8 parts of solvent naphtha and 11.7 parts of bodied Chinawood oil. When this material is suitably dispersed it is mixed with 71.2 parts of treated asphalt distillate.

The resultant varnish is applied to a piece of black carriage cloth in the usual manner and vulcanized for 2½ hours at 250 degrees Fahrenheit. The varnish film on the rubberized fabric finished with the above varnish is non-brittle and remains non-brittle after prolonged weather aging. The film shatters microscopically on sharp bending but does not develop large cracks and does not peel off the surface of the fabric.

Certain advantages result from the substitution of part or all of the drying oil in the composition outlined above by asphalt, petroleum flux or other bituminous materials. We give below two examples of compositions of this type.

Example I

| | Parts |
|---|---|
| Pigment | 27 |
| Asphalt oil | 85 |
| (Drying oil | 8 |
| (Petroleum flux | 12 |
| Gasoline | 8 |

Example II

| | Parts |
|---|---|
| Pigment | 35 |
| Asphalt oil | 80 |
| (Drying oil | 6 |
| (Petroleum asphalt | 12 |
| Gasoline | 10 |

The composition may also comprise asphalt oil, pigment, bituminous materials (asphalt, petroleum residue, stearin pitch or bitumen) and thinner and two examples of this type of composition are given.

*Example III*

| | Parts |
|---|---|
| Pigment | 30 |
| Asphalt oil | 90 |
| Petroleum asphalt | 20 |
| Gasoline | 12 |

*Example IV*

| | Parts |
|---|---|
| Pigment | 50 |
| Asphalt oil | 100 |
| Petroleum asphalt | 16 |
| Thinner | 12 |

The asphalt distillate may be used raw or heat bodied to any degree and any asphaltic compound can be used in its manufacture although a petroleum flux is preferred. Gilsonite, stearin pitch, natural oil asphalt or other bitumens may be used.

Pigment grinds may be made with either the drying oil or the asphalt distillate or both as the vehicle and any type of grinding apparatus which is suitable for grinding paints or lacquers may be used.

The thinner may very suitably be gasoline although xylol, toluol or other hydrocarbon solvents may be used.

The varnish may be applied to any flexible fabric coated with any composition or compound particularly one which is penetrable by asphalt oil such as rubber, bituminous compositions, drying oil compositions, etc., although a rubber base is preferred.

The proportions of the materials used may be varied within the following limits.

| | |
|---|---|
| Asphalt oil | 40 to 85% |
| Pigment | 10 to 40% |
| Combinations of bituminous material and drying oil | 5 to 30% |

This latter combination may consist of every combination from 100% drying oil to 100% bitumen.

The invention may be used for the manufacture of colored rubber coated fabrics for the automobile industry such as automobile top material and upholstery and likewise for the production of colored rubber coated material for the apparel industry such as raincoats, aviator caps, etc.

The asphalt oil varnishes which comprise this invention are not only novel in composition, differing widely in character from the prior art, but produce results which are equally novel. The prior art light colored varnish has such poor durability to sunlight and weather that rubber coated fabrics, finished with prior art varnishes, have found practically no sale in the field of artificial leather which must withstand sunlight and weather, for example, automobile top material.

The asphalt oil varnishes, on the other hand, are, as far as we known, entirely new and novel types of finishing varnishes. They are applicable to baking and are preferred when baked over surfaces which seem to be penetrated by the asphalt oil ingredient of the varnish.

As many apparently widely different embodiments of this invention may be made without departing from the spirit thereof, it is to be understood that we do not limit ourselves to the foregoing examples or description, except as indicated in the following patent claims.

We claim:

1. As an article of manufacture, a rubber coated fabric having a final baked coat of a composition comprising asphalt oil, pigment and drying oil, said asphalt oil being an unsaturated distillate of asphalt.

2. As an article of manufacture, a rubber coated fabric having a final baked coat of a composition comprising 40% to 85% asphalt oil, 10% to 40% pigment and 5% to 30% combination of bituminous material and drying oil, said asphalt oil being an unsaturated distillate of asphalt.

3. As an article of manufacture, a rubber coated fabric having a final coat of asphalt oil composition, said asphalt oil being an unsaturated distillate of asphalt.

4. As an article of manufacture, a rubber coated fabric having a final coat of baked asphalt oil composition, said asphalt oil being an unsaturated distillate of asphalt.

5. As an article of manufacture, a rubber coated fabric having a plurality of coatings of baked asphalt oil composition, said asphalt oil being an unsaturated distillate of asphalt.

WILLIAM STEWART GOCHER.
ARTHUR N. PARRETT.